United States Patent
Saigo et al.

(10) Patent No.: US 7,091,696 B2
(45) Date of Patent: Aug. 15, 2006

(54) METHOD AND APPARATUS FOR REGULATING STATE OF CHARGE IN BATTERY ASSEMBLY

(75) Inventors: Tsutomu Saigo, Shizuoka (JP); Ken Ito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 198 days.

(21) Appl. No.: 10/659,254

(22) Filed: Sep. 11, 2003

(65) Prior Publication Data

US 2004/0056639 A1    Mar. 25, 2004

(30) Foreign Application Priority Data

Sep. 25, 2002   (JP)   .............................. 2002-279505

(51) Int. Cl.
*H02J 7/00* (2006.01)

(52) U.S. Cl. ..................................... 320/120

(58) Field of Classification Search ................ 320/120, 320/118, 116; 324/426
See application file for complete search history.

(56) References Cited

U.S. PATENT DOCUMENTS

| 5,956,241 | A | * | 9/1999 | LoCascio | .................. | 363/21.14 |
| 5,982,143 | A | * | 11/1999 | Stuart | .......................... | 320/119 |
| 6,459,236 | B1 | * | 10/2002 | Kawashima | ................ | 320/118 |
| 6,577,135 | B1 | * | 6/2003 | Matthews et al. | .......... | 324/426 |
| 6,762,588 | B1 | * | 7/2004 | Miyazaki et al. | ........... | 320/116 |

FOREIGN PATENT DOCUMENTS

JP           10-225005           8/1998

* cited by examiner

*Primary Examiner*—Pia Tibbits
(74) *Attorney, Agent, or Firm*—Armstrong, Kratz, Quintos, Hanson & Brooks, LLP.

(57) ABSTRACT

A method and an apparatus for regulating state of charge in a battery assembly in which respective voltages across unit cells can be equalized in a short time. Among a plurality of unit cells B1 to B4 ... Bn, the unit cell having the largest voltage across the cell is referred to as the largest unit cell, and the unit cell having the smallest voltage across the cell is referred to as the smallest unit cell. Electric charge is transferred from the largest unit cell to a capacitor $C_B$ so that the voltage across the capacitor $C_B$ may be made higher than the voltage across the largest unit cell. Thereafter, the electric charge is transferred from the capacitor $C_B$ to the smallest unit cell thereby to equalize the voltages across the unit cells.

2 Claims, 2 Drawing Sheets

METHOD AND APPARATUS FOR REGULATING STATE OF CHARGE IN BATTERY ASSEMBLY

BACKGROUND OF THE INVENTION

1. Field of the Invention

The present invention relates to a method and an apparatus for regulating state of charge, and more particularly, to the method and the apparatus for regulating the state of charge in a battery assembly which includes a plurality of secondary cells as unit cells connected in series.

2. Description of the Related Art

In an electric car driven by an electric motor and in a hybrid electric car driven by both an engine and an electric motor, a battery assembly including a plurality of secondary cells as unit cells connected in series, such as a nickel-metal hydride battery, a lithium battery, has been employed as a power source for the electric motor.

It has been known that the above described battery assembly has had such a problem that due to repeated charging and discharging of electricity, variations may occur in respective voltages across the cells depending on the state of charge (SOC) of the unit cells, and in case where charging and discharging of electricity are repeated while the variations remain unsolved, some of the unit cells may fall in an excessively charged state or in an excessively discharged state.

Under the circumstances, it is proposed, in Japanese Patent Laid-open Publication No.10-225005, that the unit cells are respectively connected to a capacitor having a determined capacitor voltage. In this structure, electric charge of the unit cell which has a higher voltage across the cell than the capacitor voltage is transferred to the capacitor, and contrarily, the capacitor voltage is transferred to the unit cell which has a lower voltage across the cell than the capacitor voltage. In other words, the stored electric charge is transferred from the unit cell having the higher voltage across the cell to the unit cell having the lower voltage across the cell by way of the capacitor, and consequently, the variations in the respective voltages across the unit cells can be eliminated.

However, according to the method proposed in Japanese Patent Laid-open Publication No. 10-225005, when the respective voltages across the unit cells have been equalized and the variations in the respective voltages across the unit cells have been minimized, differences between the capacitor voltage and the respective voltages across the unit cells will be decreased. As the results, an amount of the electric charge to be transferred will be decreased, and it will take a considerable time to completely equalize the voltages across the unit cells.

In view of the above described problems, an object of the present invention is to provide a method and an apparatus for regulating state of charge in a battery assembly in which respective voltages across unit cells constituting the battery assembly can be equalized in a short time.

SUMMARY OF THE INVENTION

In order to solve the above described problem, there is provided, according to the present invention, a method for regulating state of charge in a battery assembly including a plurality of secondary cells as unit cells which are connected in series, wherein electric charge is transferred from the largest unit cell having the largest voltage across the cell among a plurality of the unit cells to a capacitor so that the voltage across the capacitor may be made higher than the voltage across the largest unit cell, and thereafter, the electric charge is transferred from the capacitor to the smallest unit cell having the smallest voltage across the cell, whereby the respective voltages across the unit cells are equalized.

According to the above described feature of the invention, among a plurality of the unit cells, the unit cell having the largest voltage across the cell is referred to as the largest unit cell, and the unit cell having the smallest voltage across the cell is referred to as the smallest unit cell. Electric charge is transferred from the largest unit cell to the capacitor so that the voltage across the capacitor may be made higher than the voltage across the largest unit cell. Thereafter, the electric charge is transferred from the capacitor to the smallest unit cell thereby to equalize the voltages across the unit cells.

Therefore, as compared with the conventional case in which electric charge has been transferred from the largest unit cell to the smallest unit cell only in an amount corresponding to a difference between the voltage across the capacitor and the voltage across the largest unit cell, the amount of the electric charge to be transferred from the capacitor to the smallest unit cell per unit time and the amount of the electric charge to be transferred per one charging can be increased according to the present invention, since the voltage across the capacitor is made higher than the voltage across the largest unit cell.

According to the present invention, there is further provided an apparatus for regulating state of charge in a battery assembly including a plurality of secondary cells as unit cells which are connected in series, the apparatus including voltage detecting means for detecting respective voltages across the unit cells, and equalizing means for equalizing the respective voltages across the unit cells by transferring electric charge from the largest unit cell having the largest voltage across the cell to a capacitor, and thereafter, by transferring the electric charge from the capacitor to the smallest unit cell having the smallest voltage across the cell, wherein the equalizing means transfers the electric charge from the largest unit cell to the capacitor so that the voltage of the capacitor may be made higher than the voltage across the largest unit cell.

According to the above described feature of the invention, the voltage detecting means detects the respective voltages across the unit cells. The equalizing means transfers the electric charge from the largest unit cell to the capacitor so that the voltage across the capacitor may be made higher than the voltage across the largest unit cell. Thereafter, the equalizing means transfers the electric charge from the capacitor to the smallest unit cell so as to equalize the voltages across the cells.

Therefore, as compared with the conventional case in which electric charge has been transferred from the largest unit cell to the smallest unit cell only in an amount corresponding to a difference between the voltage across the capacitor and the voltage across the largest unit cell, the amount of the electric charge to be transferred from the capacitor to the smallest unit cell per unit time and the amount of the electric charge to be transferred per one charging can be increased according to the present invention, since the voltage across the capacitor is made higher than the voltage across the largest unit cell.

According to another feature of the present invention, the equalizing means connects the largest unit cell to the capacitor by way of a voltage converter.

According to the above described feature, the equalizing means connects the largest unit cell to the capacitor by way of the voltage converter. Therefore, by employing the voltage converter to raise the voltage across the largest unit cell, the electric charge can be easily transferred from the largest unit cell to the capacitor so that the voltage across the capacitor may be made higher than the voltage across the largest unit cell.

According to a further feature of the invention, the voltage converter is of a voltage raising type which will raise the voltage across the largest unit cell up to the largest operational voltage of the unit cells.

According to the above described feature, the voltage converter raises the voltage across the largest unit cell up to the largest operational voltage of the unit cells. Consequently, the voltage across the largest unit cell will not become higher than the largest operational voltage of the unit cells, and therefore, the electric charge can be easily transferred from the largest unit cell to the capacitor so that the voltage across the capacitor may be made higher than the voltage across the largest unit cell.

DESCRIPTION OF THE PREFERRED EMBODIMENTS

Figure 1:
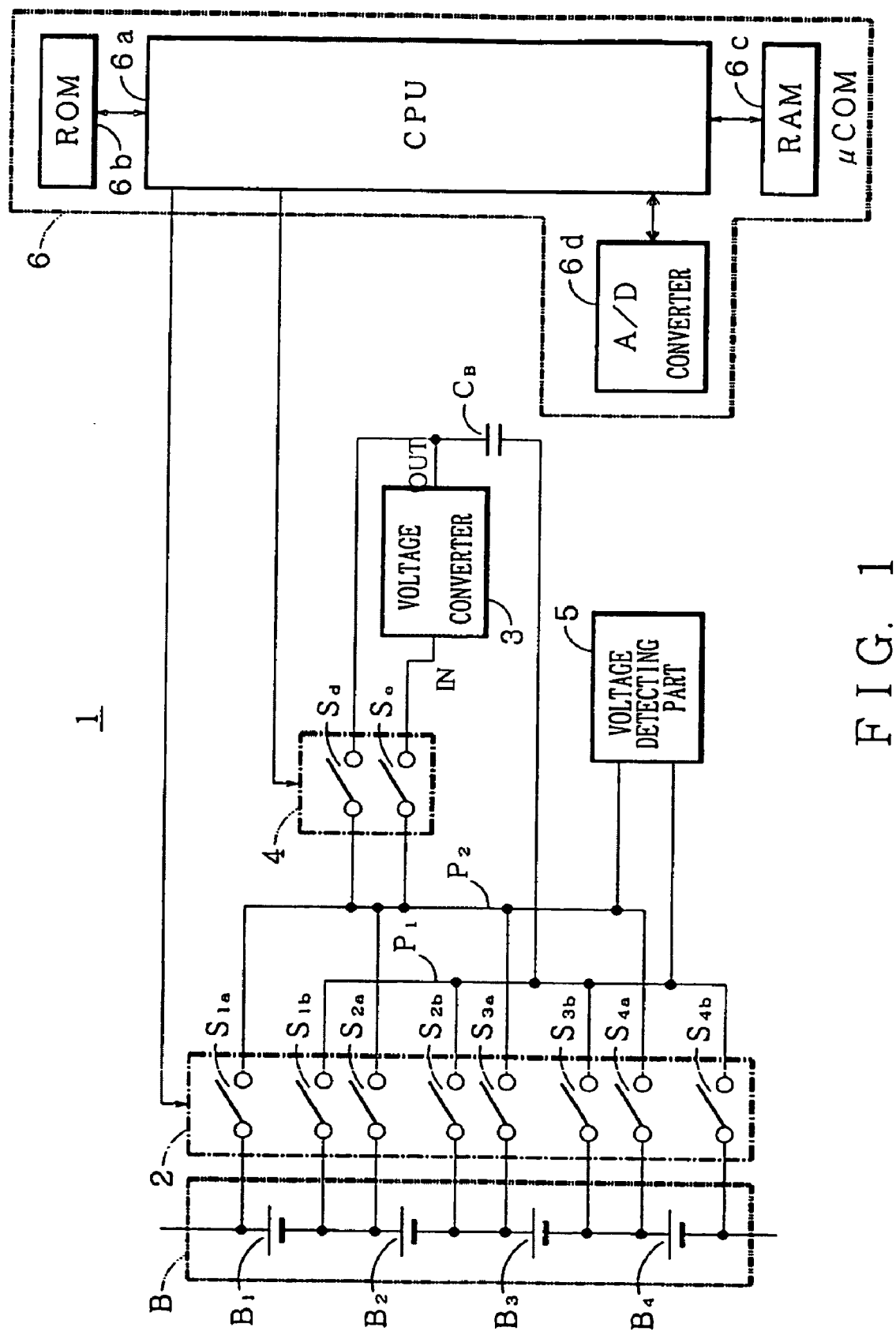
FIG. 1 is a circuit diagram showing an apparatus for regulating state of charge in a battery assembly according to an embodiment of the present invention.

FIG. 1 is a circuit diagram showing an apparatus for regulating state of charge in a battery assembly (hereinafter referred to as a regulating apparatus) according to an embodiment of the present invention.

In FIG. 1, reference numeral 1 represents the regulating apparatus to be used in a hybrid electric car (hereinafter referred to as a vehicle) employing both an engine and an electric motor (both are not shown) as driving sources, in which the regulating apparatus 1 is connected for use to a main battery B (a battery assembly) which is an electric source of the above mentioned electric motor.

The main battery B includes unit cells, i.e. secondary cells B1, B2, B3, B4 . . . Bn connected in series. The electric motor and so on are connected to both ends of the main battery B as loads according to necessity, and in addition, an alternator or the like (not shown) is connected thereto as a charging device according to necessity.

The regulating apparatus 1 in this embodiment is further provided with a group 2 of switches. The group 2 of the switches includes switches S1a, S2a, S3a, S4a . . . Sna whose one ends are respectively connected to positive terminals of the unit cells B1, B2, B3, B4 . . . Bn, and switches S1b, S2b, S3b, S4b . . . Snb whose one ends are respectively connected to negative terminals of the unit cells B1, B2, B3, B4 . . . Bn. The other ends of the switches S1a, S2a, S3a, S4a . . . Sna are connected with one another, and the other ends of the switches S1b, S2b, S3b, S4b . . . Snb are also connected with one another.

The regulating apparatus 1 includes a capacitor $C_B$, a voltage converter 3 of a voltage raising type, a group 4 of switches which are provided between a connection point P2 of the other ends of the switches S1a, S2a, S3a, S4a . . . Sna and a connection point P1 of the other ends of the switches S1b, S2b, S3b, S4b . . . Snb. The voltage converter 3 is a converter of such a type that it will raise the voltages across the unit cells B1, B2, B3, B4 . . . Bn connected to both ends thereof up to the maximum operational voltage of the unit cells B1, B2, B3, B4 . . . Bn, for example, and supply the voltage to the capacitor $C_B$.

The group 4 of the switches includes a switch Sd for connecting one end of the capacitor $C_B$ directly to the connection point P2 when it is turned on, and a switch Se for connecting the one end of the capacitor $C_B$ to the connection point P1 by way of the voltage converter 3 when it is turned on.

The regulating apparatus 1 further includes a voltage detecting part 5 which is provided between the connection point P1 and the connection point P2, in parallel with the capacitor $C_B$, the voltage converter 3, and the group 4 of the switches. This voltage detecting part 5 is adapted to output voltage signals corresponding to the voltages across the unit cells B1, B2, B3, B4 . . . Bn which are connected to both ends thereof, that is, between the connection point P1 and the connection point P2.

Still further, the regulating apparatus 1 includes a micro computer (hereinafter referred to as μCOM) 6 to which control terminals of the switches in the group 2 and the group 4 are connected. The μCOM 6 has a central processing unit (hereinafter referred to as CPU) 6a for performing various processes according to programs, a read-only memory ROM 6b in which the programs for the processes of the CPU 6a are stored, a reading and writing memory RAM 6c having work areas to be utilized in the various processes in the CPU 6a, data memory areas for storing various data and so on, and an A/D converter 6d which converts analogue voltage signals supplied from the above described voltage detecting part 5 into digital signals to be outputted to the CPU 6a. All these units are connected by means of bus lines.

Figure 2:
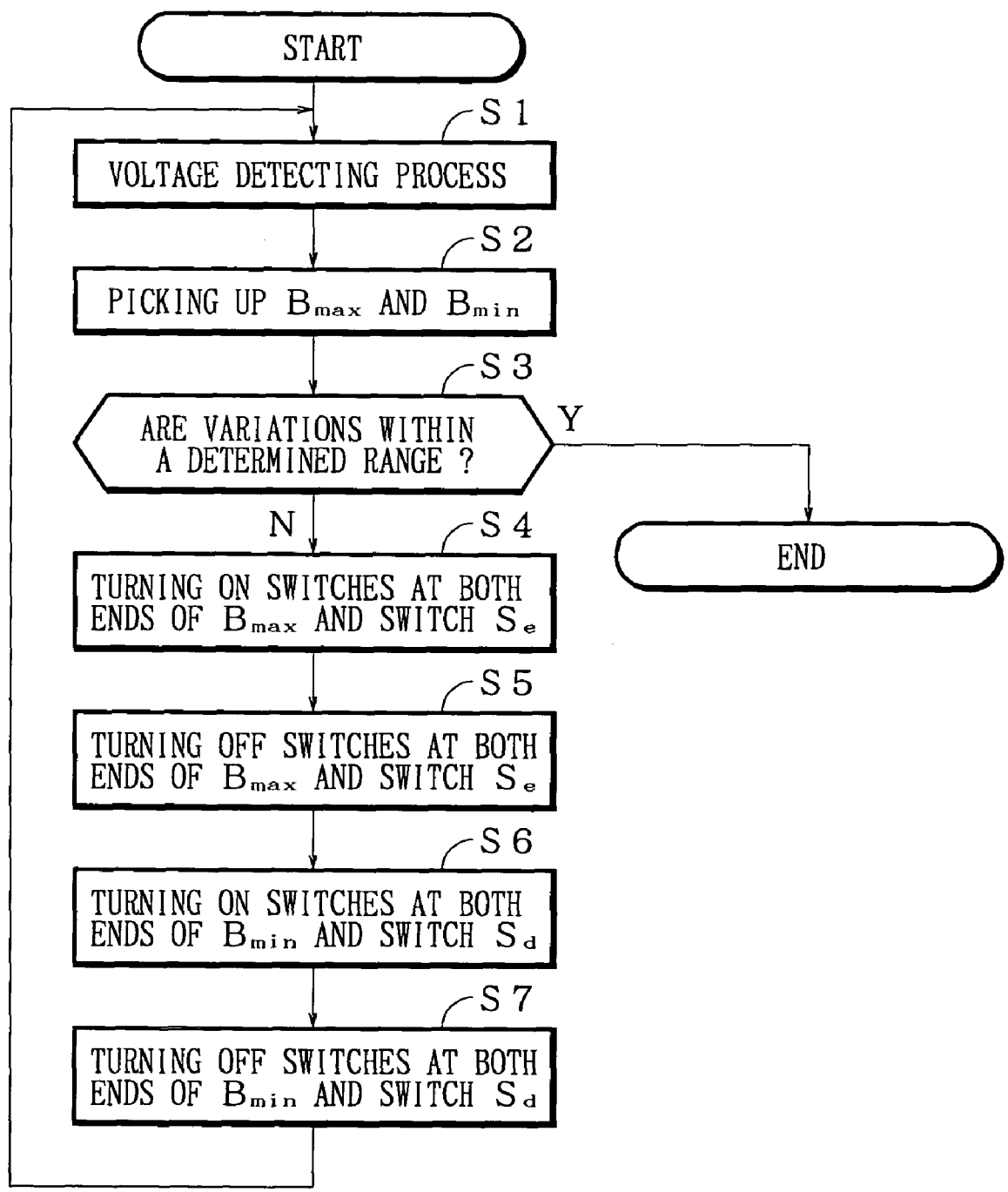
FIG. 2 is a flow chart showing steps for processing a central processing unit which is a part of the regulating apparatus in FIG. 1.

Now, referring to a flow chart in FIG. 2 showing the steps for the processes of the CPU 6a, operation of the regulating apparatus 1 having the above described structure will be explained. Operation of the CPU 6a is started by turning off an ignition switch of a vehicle which has no probability of running. In an initial step which is not shown, initial setting of the various areas formed in the RAM 6c in the μCOM 6 has been performed, and thereafter, a first step S1 will be started.

In the step S1, the CPU 6a acts as voltage detecting means and conducts a voltage detecting process for detecting the respective voltages across all the unit cells B1 to B4 . . . Bn. Specifically, the CPU 6a sequentially turns on the switches S1a to S4a . . . Sna and S1b to S4b . . . Snb of the unit cells B1 to B4 . . . Bn thereby to connect both ends of the unit cells B1 to B4 . . . Bn sequentially to the voltage detecting part 5.

With this operation, electric signals corresponding to the voltages across the unit cells B1 to B4 . . . Bn are supplied from the voltage detecting part 5 to the CPU 6a, in synchronization with ON or OFF of the switches in the switch group 4. The above mentioned electric signals have already been converted into the digital signals by the A/D converter 6d. Then, the CPU 6a reads the supplied electric signals thereby to perform the voltage detecting process.

In the next step, the CPU 6a picks up, according to the results of the voltage detecting process, the largest unit cell Bmax which has the largest voltage across the cell and the smallest unit cell Bmin which has the smallest voltage across the cell, out of the unit cells B1 to B4 . . . Bn (Step S2).

Thereafter, in case where variations in the voltages across the unit cells B1 to B4 . . . Bn are within a determined range (the answer is Y, in the step S3), the CPU 6a finishes the process. On the other hand, in case where variations in the voltages across the unit cells B1 to B4 . . . Bn are out of a determined range (the answer is N, in the step S3), the CPU 6a proceeds to the next step S4. Specifically, in case where a difference between the voltage across the largest unit cell Bmx and the voltage across the smallest unit cell Bmin is more than the determined voltage in the step S3, the CPU 6a concludes that the variations are out of the determined range.

In the step S4, the CPU 6a turns on the switches at both ends of the largest unit cell Bmax and the switch Se (Step S4) With this operation, both the ends of the largest unit cell Bmax are connected to the capacitor $C_B$ by way of the voltage converter 3.

As a result of this connection, the voltage converter 3 will convert the voltage inputted from an anode of the largest unit cells Bmax up to the largest operational voltage of the unit cells B1 to B4 . . . Bn. Because the voltage at an anode of the capacitor $C_B$ has been set to be smaller than the largest operational voltage, by way of output of the voltage converter 3 owing to the connection, the capacitor $C_B$ will be charged up to the largest operational voltage.

After transition of the electric charge from the largest unit cell Bmax to the capacitor $C_B$ by way of the voltage converter 3 has finished, the CPU 6a turns off the switches at both ends of the largest unit cell Bmax and the switch Se (Step S5). Then, the CPU 6a turns on the switches at both ends of the smallest unit cell Bmin and the switch Sd (Step S6).

Accordingly, both the ends of the smallest unit cell Bmin are directly connected to the capacitor $C_B$ without intervention of the voltage converter 3. As the result of this connection, the electric charge corresponding to a difference between the voltage across the capacitor $C_B$ which is equal to the largest operational voltage and the voltage across the smallest unit cell Bmin will flow from the capacitor $C_B$ to the smallest unit cell Bmin.

After the transition of the electric charge from the capacitor $C_B$ to the smallest unit cell Bmin has finished, the CPU 6a turns off the switches at both the ends of the smallest unit cell Bmin and the switch Sd (Step S7), and returns to the step S1. With the above described operation, the electric charge is transferred from the largest unit cell Bmax to the smallest unit cell Bmin by way of the capacitor $C_B$, and the variations in the voltages across the unit cells B1 to B4 . . . Bn can be eliminated.

Then, effects of the above described regulating apparatus 1 will be explained. An amount of the transferred electric charge in case where both the ends of the largest cells Bmax are directly connected to both the ends of the capacitor $C_B$ without intervention of the voltage converter 3 as in the conventional case will be first described. When the capacitor $C_B$ has been charged by the largest unit cell Bmax, it is presumed that the voltage across the largest unit cell Bmax is 3.78V, the voltage across the smallest unit cell Bmin is 3.73V, and the voltage across the capacitor $C_B$ is 3.78V. Because the voltage converter 3 is not provided, the voltage across the largest unit cell Bmax is equal to the voltage across the capacitor $C_B$.

When both the ends of the smallest unit cell Bmin are connected to both the ends of the capacitor $C_B$, charging electric current which flows from the capacitor $C_B$ to the smallest unit cell Bmin is (3.78V−3.73V)/R=0.05/R, wherein R is a circuit resistance. In the conventional case, as the equalization proceeds, the difference between the voltage across the largest unit cell Bmax and the voltage across the smallest unit cell Bmin will be minimized, and the electric current for charge will be further minimized.

In short, the charging electric current has depended on the difference between the voltage across the largest unit cell Bmax and the voltage across the smallest unit cell Bmin, in the conventional case. For this reason, as the equalization proceeds, an amount of the transferred electric charge per unit time will be decreased, and one transition of the electric charge from the largest unit cell Bmax to the smallest unit cell Bmin will take a longer time. Moreover, the amount of the electric charge transferred per one transition will be also decreased, and number of the transitions per unit electric charge will be increased, resulting in a delay of equalizing time.

Then, an amount of the transferred electric charge in case where both the ends of the largest unit cells Bmax are connected to both the ends of the capacitor $C_B$ by way of the voltage converter 3 for charging the capacitor $C_B$ up to the largest operational voltage of the unit cells B1 to B4 . . . Bn by means of the voltage converter 3, in the regulating apparatus 1 in the present embodiment, will be described. The largest operational voltage is herein presumed to be 4.2V, which is the largest operational voltage of a lithium battery.

As a result of charging the capacitor $C_B$ by the largest unit cell Bmax by way of the voltage converter 3, it is presumed that the voltage across the largest unit cell Bmax is 3.78V, the voltage across the smallest unit cell Bmin is 3.73V, and the voltage across the capacitor $C_B$ is 4.2V. Because the voltage converter 3 is provided, the voltage across the capacitor $C_B$ is made higher than the voltage across the largest unit cell Bmax.

When both the ends of the smallest unit cell Bmin are connected to both the ends of the capacitor $C_B$, charging electric current which flows from the capacitor $C_B$ to the smallest unit cell Bmin is (4.2V−3.73V)/R=0.47/R. As apparent from this fact, the charging electric current depends on a difference between the largest operational voltage 4.2V and the voltage across the smallest unit cell Bmin. Therefore, because the voltage across the capacitor $C_B$ is made higher than the voltage across the largest unit cell Bmax, the amount of the electric charge to be transferred per unit time and the amount of the electric charge to be transferred during one transition of the electric charge will be increased, resulting in shorter equalization time as compared with the conventional case. Therefore, according to the present embodiment, it is possible to equalize the unit cells constituting the battery B in a short time.

According to the above described embodiment, the voltage inputted from the anode of the largest unit cell Bmax is converted up to the largest operational voltage of the unit cells B1 to B4 . . . Bn by means of the voltage converter 3. However, the invention is not limited to this embodiment, but the voltage outputted to the anode of the capacitor $C_B$ may be raised to a value equal to or more than the voltage of the largest unit cell Bmax. Since the voltage across the largest unit cell Bmax will not be higher than the largest operational voltage of the unit cells B1 to B4 . . . Bn, the voltage converter 3 can reliably convert the voltage inputted from the largest unit cell Bmax and output the converted voltage to the capacitor $C_B$, so that the voltage of the capacitor $C_B$ may be made equal to or higher than the voltage across the largest unit cell Bmax.

Although the present invention has been fully described by way of an example with reference to the accompanying drawings, it is to be noted that various changes and modifications can be made within a scope of the present invention.

What is claimed is:

1. An apparatus for regulating state of charge in a battery assembly including a plurality of secondary cells as unit cells which are connected in series, said apparatus comprising;

voltage detecting means for detecting respective voltages across said unit cells, and equalizing means for equalizing the respective voltages across said unit cells by transferring electric charge from the largest unit cell having the largest voltage across the cell to a capacitor, and thereafter, by transferring the electric charge from said capacitor to the smallest unit cell having the smallest voltage across the cell, wherein said equalizing means transfers the electric charge from said largest unit cell to said capacitor so that the voltage of said capacitor may be made higher than the voltage across said largest unit cell, wherein said equalizing means is a voltage converter of which input is connected to said largest unit cell and of which output is connected to said capacitor.

2. The apparatus for regulating state of charge as claimed in claim 1, wherein said voltage converter is of a voltage raising type which will convert the voltage inputted from said largest unit cell up to the largest operational voltage of said unit cells.

* * * * *